June 27, 1944.  R. OVERHOLT, JR  2,352,283
ELECTRICAL RECTIFIER
Filed May 28, 1942   2 Sheets—Sheet 1

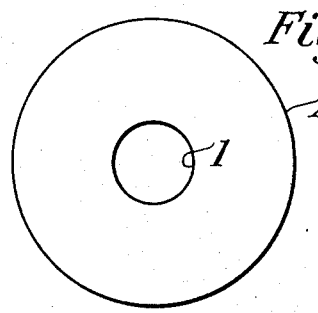
Fig.1.

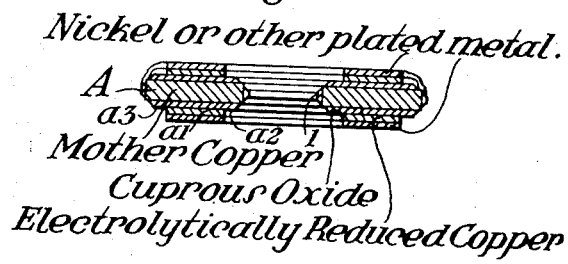
Fig.7.
Nickel or other plated metal.
Mother Copper
Cuprous Oxide
Electrolytically Reduced Copper

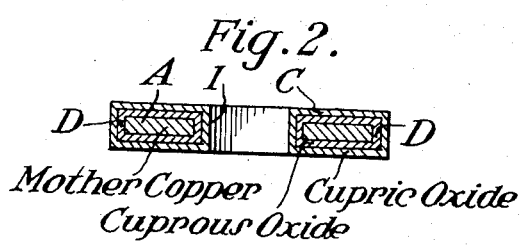
Fig.2.
Mother Copper / Cupric Oxide
Cuprous Oxide

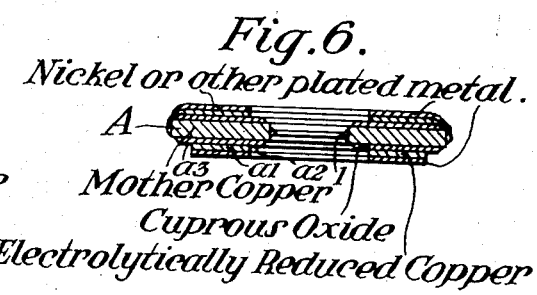
Fig.6.
Nickel or other plated metal.
Mother Copper
Cuprous Oxide
Electrolytically Reduced Copper

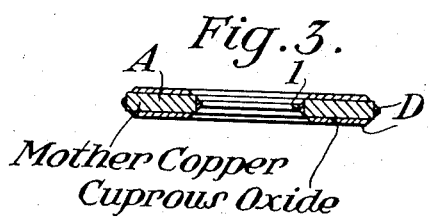
Fig.3.
Mother Copper
Cuprous Oxide

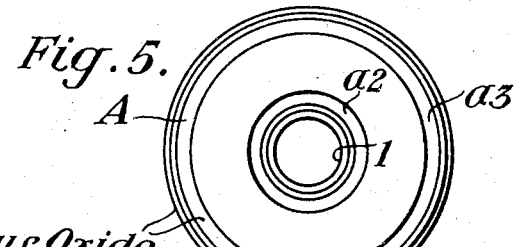
Fig.5.
Cuprous Oxide
Mother Copper
Nickel or other plated metal.

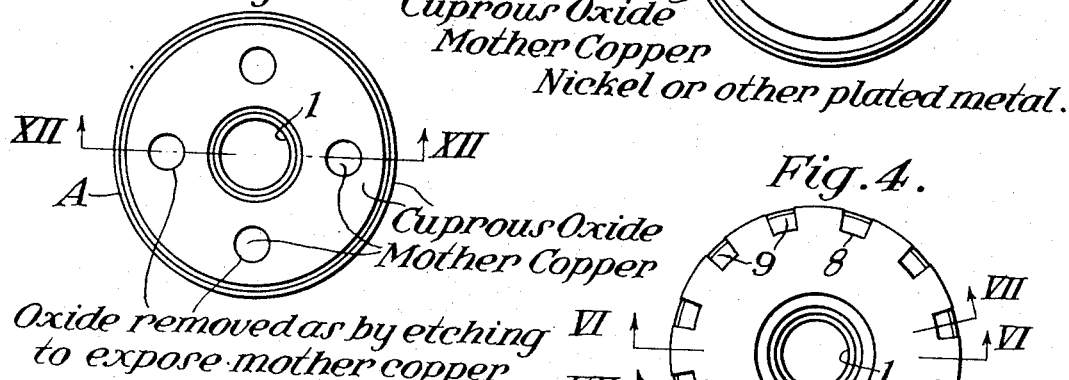
Fig.11.
Cuprous Oxide
Mother Copper
Oxide removed as by etching to expose mother copper Fig.4.
Cuprous Oxide
Nickel or other plated metal.

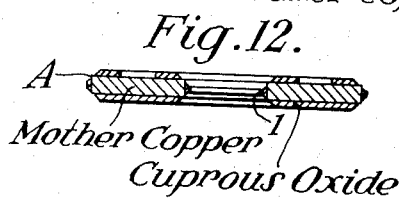
Fig.12.
Mother Copper
Cuprous Oxide

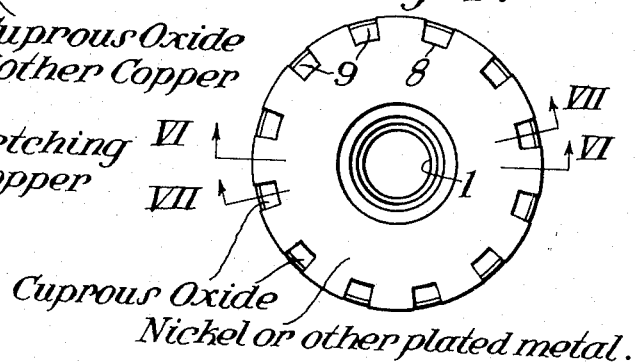

INVENTOR
Ralph Overholt Jr.
BY
HIS ATTORNEY.

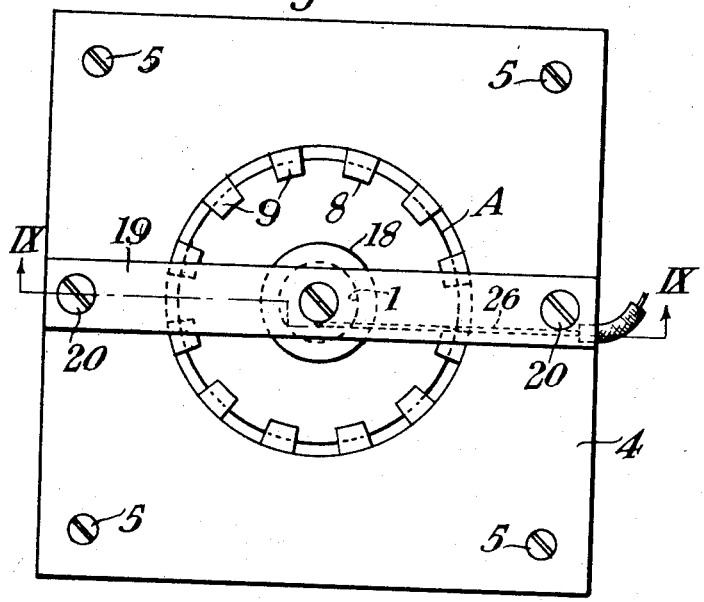
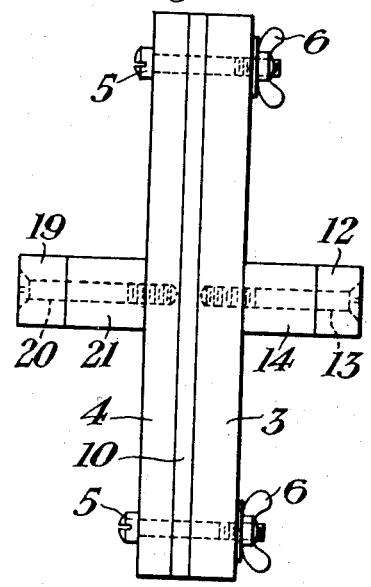
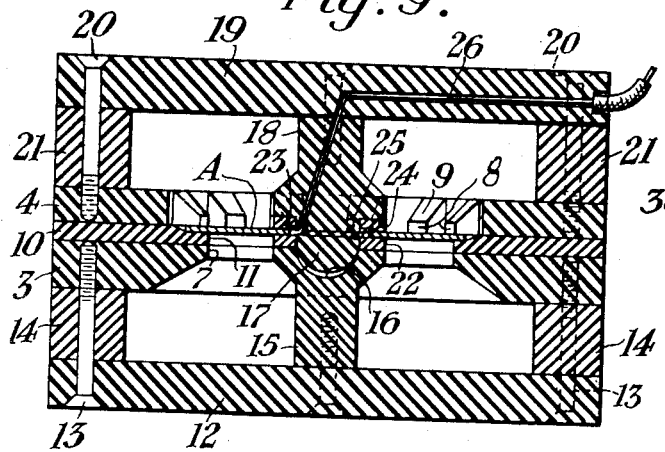
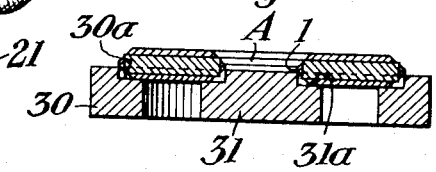
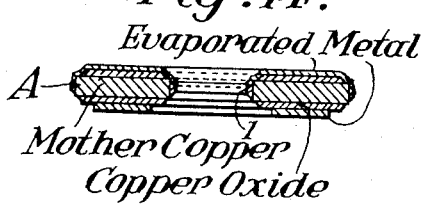

Patented June 27, 1944

2,352,283

UNITED STATES PATENT OFFICE 2,352,283

ELECTRICAL RECTIFIER

Ralph Overholt, Jr., Dayton, Ohio, assignor to The Union Switch and Signal Company, Swissvale, Pa., a corporation of Pennsylvania Application May 28, 1942, Serial No. 444,787

10 Claims. (Cl. 175—366)

My invention relates to electrical rectifiers, and particularly to electrical rectifiers of the well-known copper oxide type.

When copper oxide rectifier elements are manufactured from thin copper, it is desirable to oxidize the elements on both sides, and to subsequently leave them oxidized on both sides, to prevent warpage or distortion. It is also desirable, particularly with the smaller sizes of elements, to be able to assemble them into stacks in which contact is made on one side of the element with the oxide layer on such side and on the other side of the element with the mother copper of the element. To obtain the desired contact with the oxide layer on one side and with the mother copper on the other side, when the elements are thin and are left oxidized on both sides is extremely difficult, and one object of my present invention is to provide a satisfactory method and means for accomplishing this desirable result.

According to my invention, the elements after being oxidized on both sides in any suitable manner are chemically treated by means which causes the mother metal to be exposed at the inside and outside edges of both sides of the element. The exposed mother metal at both the inside and outside edges of one side of the element is then masked in any suitable manner and both sides of the elements are coated with a contact metal which may be applied by plating, evaporation, cathode sputtering or the like. The contact metal on the side of the element whose inside and outside edges are masked makes contact only with the adjacent oxide layer, while the contact metal on the other side makes contact both with the adjacent oxide layer and with the mother metal. The contact metal has good lateral conductivity, and since it contacts only the adjacent oxide layer on one side of the element, and both the mother copper and the adjacent oxide layer on the opposite side, it enables the elements to be assembled in the usual type of rectifier stack referred to hereinbefore in the same manner as the well-known form of elements which are oxidized on one side only.

I shall describe three forms of rectifiers embodying my invention and one method for preparing each form, and shall then point out the novel features thereof in claims.

In the accompanying drawings, Fig. 1 is a view showing in elevation one form of blank ready to be prepared as a rectifier element in accordance with one process of manufacture embodying my invention. Figs. 2 and 3 are vertical sectional views showing, in exaggerated form, a rectifier element as it appears in certain steps in the process of manufacture embodying my invention. Figs. 4 and 5 are top and bottom views, respectively, showing a completed rectifier element constructed in accordance with one process of manufacture embodying my invention. Figs. 6 and 7 are sectional views taken on the lines VI—VI and VII—VII, respectively, of Fig. 4. Figs. 8, 9 and 10 are top plan, vertical sectional, and side elevational views, respectively, of a masking device employed in a portion of one process of manufacture embodying my invention. Fig. 11 is a top plan view showing a modified form of rectifier element as it appears in one step of the process embodying my invention. Fig. 12 is a sectional view taken on the line XII—XII of Fig. 11. Fig. 13 is a view of a masking device employed in another process of manufacture embodying my invention. Figs. 14 and 15 are vertical sectional views showing completed rectifier elements constructed in accordance with other processes of manufacture also embodying my invention.

Similar reference characters refer to similar parts in each of the several views.

Referring first to Fig. 1, the reference character A designates a copper blank ready to be formed into a rectifier element in accordance with my invention. As shown, this blank is of circular configuration, and is provided with a central aperture $l$, although this particular form is not essential to my invention. The blank A after being cleaned in any suitable manner, as by an acid etch, is subjected to an oxidizing treatment to form oxide layers of equal thicknesses on both sides of the blank. This oxidizing treatment is well known, and since it forms no part of my present invention, it is deemed unnecessary to describe it herein. Following this treatment, the blank will appear as shown in Fig. 2 from which it will be seen that it is now covered with an inner coating D of cuprous or red oxide of copper and a thin outer coating C of cupric or black oxide of copper.

After the oxidation is completed the oxidized blank, which I shall hereinafter refer to as a rectifier element, is treated to remove the cupric oxide layer from the entire surface of the element. This treatment may take a variety of forms, but will preferably consist in subjecting the element to a solution consisting of 2 per cent by volume of sulphuric acid and .1 per cent by volume of hydrochloric acid in water. The temperature at which the solution is used is not critical, but the desired action of the solution is materially speeded up if the solution is hot preferably at a temperature of 80° to 100° C. With an 80° C.

solution, the element is preferably immersed in the solution for a time interval which is approximately twice as long as is required to remove the cupric oxide. After the element has been immersed in the solution for the desired period of time, it is then removed from the solution, washed in water, and thoroughly dried.

The element is next preferably immersed for a short period of time (of the order of one to three seconds) in concentrated nitric acid, and is then thoroughly rinsed in water to remove all traces of the acid. To insure that no impurities are left on the element from the rinse water, the final rinse water should be distilled water unless the available water is known to be free from injurious impurities. The immersion in the nitric acid removes any loose or finely divided copper left on the element by the treatment of the sulphuric and hydrochloric acid solution and insures that the copper oxide surface will be sufficiently clean for certain subsequent steps which should preferably be performed before the element has had any chance to accumulate any foreign substances either from the atmosphere or otherwise. The element following this step will appear as illustrated in Fig. 3 in which D designates the cuprous oxide remaining on the element. It should be particularly noted that as shown in Fig. 3 there is a clean cut discontinuity between the cuprous oxide and the mother copper at the inside and outside edges of the element on both sides of the element. This is desirable for a purpose which will be made clear presently.

The portion of the process of manufacture of the element thus far described is well known, and differs from that described in detail in Letters Patent of the United States No. 2,094,642 granted to Philip H. Dowling on October 5, 1937, for the Manufacture of electrical rectifiers only in that the blank A is initially oxidized on both sides.

According to my present invention, the element is next treated to provide it with a metal layer or coating which makes contact with the oxide layer only on one side of the element, and with both the oxide layer and the mother copper on the opposite side of the element. The metal coating can be obtained in a variety of ways as will now be made clear.

One method by which the desired coating can be obtained consists in reducing certain portions of the outer surface of the copper oxide to metallic copper and then plating the reduced portions with a suitable metal, such as nickel. On the side of the element on which the junction of the oxide coating with the mother copper is to be used for rectification, which side I shall hereinafter refer to for convenience as the rectifying side, the reduced portion preferably consists of an annular area designated a1 in Figs. 6 and 7, which area is separated or spaced from the adjacent inner and outer exposed edges of the mother copper by non-reduced annular areas designated a2 and a3, respectively, in Figs. 6 and 7. The non-reduced portions need be only wide enough to preclude any possibility of electrical contact being established with the mother copper by the reduced copper on this side of the element, and with the well-known inch and a half washer, the non-reduced areas, may for example be 1/16 of an inch in width. On the opposite side of the element, which side I shall hereinafter refer to as the non-rectifying side, the entire surface of the oxide may be reduced although for convenience in accomplishing the reduction it may be desirable to leave certain areas non-reduced for a reason which will appear presently. For purposes of my present invention, it is only necessary that a sufficient portion be reduced so that if all of the reduced portion is subsequently plated, the plating will establish good contact with the mother copper at at least one point and will provide a large enough contact area and sufficient lateral conductivity to establish a satisfactory contact with the mother copper if a contact washer or either side of a similar element is clamped against the element. The reduction and plating may be accomplished electrolytically in the manner described in Letters Patent of the United States No. 2,197,632, granted to Philip H. Dowling and John D. McCluer on August 16, 1940, except for the fact that in carrying out the reduction and plating it is necessary to use a masking means which is different from that shown in the patent. A suitable form of masking means is shown in Figs. 8, 9 and 10.

Referring to Figs. 8, 9 and 10, the masking means here shown comprises two blocks 3 and 4 of insulating material clamped together by bolts 5 provided with wing nuts 6, whereby the blocks may be readily separated. The lower block 3 is formed with a central circular opening 7 having a diameter equal to the desired outside diameter of the contact metal which is to be applied to the rectifying side of the element, and the upper block 4 is provided with an aligned opening 8 of the same diameter as the opening 7 surrounded by a plurality of projections or teeth 9. The blocks are separated by a sheet 10 of rubber, neoprene, or the like cemented or otherwise secured to the upper face of the lower block 3, and this sheet is provided with an opening 11 which has the same diameter as the openings 7 and 8, and which aligns vertically with these openings. The element to be processed is disposed between the block 4 and the rubber sheet 10 in concentric relation to the openings 7, 8 and 11 with the rectifying side facing the block 3, and is embedded into the sheet 10 by pressure applied by the teeth 9. The embedding of the element into the rubber sheet causes it to flow up around the outer lower edge of the element a sufficient distance to seal or mask the exposed lower edge of the mother copper against the action of the electrolyte during the reducing and plating steps. The teeth 9 are radially disposed, and are of such lengths that the portion of the upper outer edge of the mother copper between each two adjacent teeth will be exposed to the action of the electrolyte.

A bridging member 12 of insulating material is secured at its ends to the lower side of the block 3 by means of machine screws 13 and spacing members 14, and this bridging member is provided with a central circular leg 15 which projects upwardly into the opening 7 in the block 3. This leg is concentric with the opening 7 and is provided in its upper end with a cupped recess 16 which receives the rounded lower end 17 of a corresponding leg 18 provided on a bridging member 19 secured by means of screws 20 and spacing members 21 to the upper block 4. The leg 15 is also provided at its upper end with a rubber washer 22 cemented or otherwise secured thereto, which washer engages the underside of the rectifier element A and which has an outside diameter equal to the desired inside diameter of the contact metal which is to be applied to the rectifying side of the element. A corresponding washer 23 is secured to a shoulder 24 which surrounds the rounded lower end 17 of the leg 18, and the lower side of this washer carries a metal ring 25 in such manner that when the two blocks 3 and 4 are secured together, this ring will be pressed into engagement with the upper inside exposed edge of the mother copper. This ring is connected to a wire 26, whereby external electrical contact may readily be established with the mother copper of the element during the reducing and plating steps. The parts are so proportioned that when the element is in place in the mask, the washer 22 will engage the lower inside edge of the element and effectively mask the engaged area from the action of the electrolyte.

It will be understood that in the reducing and plating steps the mask with the element in place will be inserted bodily into the reducing or plating bath as the cathode, and current will be passed to the element through the bath from a suitable anode. As was pointed out hereinbefore, the reducing and plating steps may be carried out as described in United States Patent No. 2,197,632, and if a full description of these steps is desired reference may be had to this patent. The completed element will appear as shown in Figs. 4, 5, 6 and 7 described hereinbefore.

If desired, the contact between the metal ring 25 and the mother copper of the element may be improved by reaming out the hole 1 in the element. Furthermore, the contact between the mother copper and the contact metal on the non-rectifying side can be improved by removing small areas of the copper oxide from the non-rectifying side, by etching or otherwise, to expose the mother copper as shown in Figs. 11 and 12.

Another method by which the desired coating can be obtained consists in masking the exposed inside and outside edges of the mother copper and adjacent areas of the oxide coating on one side of the element, and then depositing by vaporization and condensation or cathodic sputtering a layer of metal such as gold or silver. Other metals such as aluminum, zinc, cadmium or copper may be applied in a similar manner. The vaporization or sputtering of the metal may be accomplished by well-known methods, and it is believed to be unnecessary, therefore, to describe these methods herein. Since the vaporized or sputtered metal appears to travel in straight lines, a simplified form of mask such as that shown in Fig. 13 may be used. As here shown, this mask consists of two concentric washers 30 and 31. The one washer 30 is provided in its inside edge with an annular recess 30a having a depth equal to about half the thickness of the element, and an outside diameter which is just large enough to snugly receive the outside edge of the element, while the other washer is provided in its outside edge with an annular recess 31a having approximately the same depth as the recess 30a, and an inside diameter which will permit the inside edge of the element to enter the recess with a relatively snug fit. The two washers 30 and 31 are fitted over the inside and outside edges of the element as shown in Fig. 13, and the metal is applied first to one side and then the other. It will be obvious that the metal applied to the upper side as viewed in Fig. 13 will contact both the upper oxide layer and the mother copper as shown in Fig. 14, while the metal applied to the lower or rectifying side will contact the oxide layer only at a central annular area.

A third method by which the desired coating can be applied includes spraying of the contact metal. Preferably in this latter method the outer surface of the oxide is first reduced to copper at all portions which are to be coated. This reduction may, for example, be accomplished electrolytically in the manner described in connection with the first method set forth hereinbefore. During the spraying step, the edges of one side of the element should be masked, and for this purpose the mask shown in Fig. 13 may be employed. The completed element will appear as shown in Fig. 15.

Although I have herein shown and described only three forms of rectifiers embodying my invention, it is understood that various changes and modifications may be made therein within the scope of the appended claims without departing from the spirit and scope of my invention.

Having thus described my invention, what I claim is:

1. As a new article of manufacture, a copper oxide rectifier comprising a copper blank oxidized on both sides to prevent warping and coated on one side with a metallic coating which contacts the mother copper to facilitate making contact with the mother copper.

2. The method of making a copper oxide rectifier element which consists in oxidizing a copper blank on both sides, treating it to expose the mother copper at an edge of the blank, and then short circuiting the oxide coating on one side of the blank by applying a metal coating which contacts the mother copper at at least one exposed point.

3. The method of making a copper oxide rectifier element which consists in oxidizing a copper blank on both sides to prevent it from warping, chemically treating the blank to form a clear cut discontinuity between the oxide coating and the mother copper at the edges of the blank, and then coating one side of the blank with a metal which contacts the mother copper at at least a part of one edge.

4. As a new article of manufacture, a copper oxide rectifier comprising a copper blank oxidized on both sides to prevent warping and coated on both sides with a metal coating, the metal coating on one side being in contact with the oxide layer only to facilitate making electrical contact therewith and the coating on the other side being in contact with both the oxide layer and with the mother copper to facilitate making contact with the mother copper.

5. The method of making contact with the mother copper and with one oxide surface of a copper-cuprous oxide rectifier element which has been oxidized on both sides that comprises chemically treating the element to expose the mother copper at the edges of both sides of the element, masking the exposed edges and an adjacent area of the oxide surface on one side of the element, reducing the exposed oxide surface to copper, and plating the reduced copper surface with another metal.

6. The method of making contact with the mother copper and with one oxide surface of a copper-cuprous oxide rectifier element which has been oxidized on both sides that comprises chemically treating the element to expose the mother copper at the edges of both sides of the element, masking the exposed edges and an adjacent area of the oxide surface on one side of the element, and then applying to the non-masked surface another metal which contacts the oxide only on the masked side and which contacts both the oxide and the mother copper on the opposite side.

7. The method of making contact with the mother copper and with one oxide surface of a copper-cuprous oxide rectifier element which has been oxidized on both sides that comprises chemically treating the element to expose the mother copper at the edges of both sides of the element, masking the exposed edges and an adjacent area of the oxide surface on one side of the element, and then applying to all of the non-masked surface of the element by vaporization and condensation a layer of metal to establish contact with the oxide layer only on one side of the element and with the mother copper on the opposite side of the element.

8. The method of making contact with the mother copper and with one oxide surface of a copper-cuprous oxide rectifier element which has been oxidized on both sides that comprises chemically treating the element to expose the mother copper at the edges of both sides of the element, masking the exposed edges and an adjacent area of the oxide surface on one side of the element, and then applying to all of the non-masked surface of the element by cathodic sputtering a layer of metal to establish contact with the oxide layer only on one side of the element and with the mother copper on the opposite side of the element.

9. The method of making contact with the mother copper and with one oxide surface of a copper-cuprous oxide rectifier element which has been oxidized on both sides that comprises chemically treating the element to form a clear cut discontinuity between the oxide and the mother copper of the element at the edges of the element, removing small areas of the copper oxide on one side of the element to expose the mother copper, said areas being insufficient in size to cause warpage, masking the exposed edges of the mother copper and an adjacent area of the oxide surface on the other side of the element, and then applying to all of the non-masked surface of the element a layer of contact metal to establish contact with the mother copper on said one side of the element and with the oxide layer only on said other side of the element.

10. The method of making contact with the mother copper and with one oxide surface of a copper-cuprous oxide rectifier element which has been oxidized on both sides that comprises chemically treating the element to expose the mother copper at the edges of both sides of the element, masking the exposed edges and an adjacent area of the oxide surface on one side of the element, reducing the exposed oxide surface to copper, and spraying the reduced copper surface with another metal which contacts the reduced copper only on the masked side of the element and both the reduced copper and the mother copper on the other side of the element.

RALPH OVERHOLT, Jr.